United States Patent [19]

Kordesch et al.

[11] Patent Number: 5,164,274

[45] Date of Patent: Nov. 17, 1992

[54] ZINC ANODES FOR ALKALINE GALVANIC CELLS, AND CELLS CONTAINING THEM

[75] Inventors: Karl V. Kordesch, Lakewood, Ohio; Yatendra Sharma, Graz, Austria; Klaus Tomantschger, Mississauga, Canada

[73] Assignee: Battery Technologies Inc., Mississauga, Canada

[21] Appl. No.: 608,841

[22] Filed: Nov. 3, 1990

[30] Foreign Application Priority Data

Nov. 6, 1989 [CA] Canada ................................. 2002348

[51] Int. Cl.⁵ ........................ H01M 6/04; H01M 6/24
[52] U.S. Cl. .................................. 429/144; 429/210; 429/220; 429/224; 429/230
[58] Field of Search ............... 429/206, 224, 229, 230, 429/231, 218, 165, 94, 249, 144, 210

[56] References Cited

U.S. PATENT DOCUMENTS

| | | | |
|---|---|---|---|
| 2,938,064 | 5/1960 | Kordesch | 429/27 |
| 3,945,847 | 3/1976 | Kordesch et al. | 429/224 X |
| 4,091,178 | 5/1978 | Kordesch | 429/224 X |
| 4,451,543 | 5/1984 | Dzieciuch et al. | 429/224 |
| 4,500,614 | 2/1985 | Nagamine et al. | 429/206 |
| 4,560,631 | 12/1985 | Nishihama et al. | 429/224 X |
| 4,601,919 | 7/1986 | Asami et al. | 429/224 |
| 5,034,291 | 7/1991 | Jacus | 429/206 |

Primary Examiner—Anthony Skapars
Attorney, Agent, or Firm—Donald E. Hewson

[57] ABSTRACT

An alkaline manganese cell—which is generally a rechargeable cell, but which may also be a primary cell—is provided, having an anode composition where the anode comprises an admixture of amalgamated zinc particles, zinc oxide and metallic copper. The metallic copper is finely divided and has a large surface area, so that the copper is distributed throughout the anode and forms an electrically conductive, low resistance structure within the anode. The metallic matrix within the anode takes the appearance of a sponge, and provides for conductivity within the anode at all stages of charge and discharge of the cell. Especially in the anode of a secondary cell, the cell will exhibit an overcharge reserve because there is a sufficient amount of zinc oxide in the anode, and it will exhibit an over discharge reserve because of the presence of metallic copper in the anode. Several processes for preparation of the zinc oxide/copper mixture are discussed, including several different chemical and electro-chemical reactions which may be followed. The preparation of the mix is exothermic, and the mixture should be kept in such a manner as to preclude its exposure to oxygen.

16 Claims, 4 Drawing Sheets

ZINC ANODES FOR ALKALINE GALVANIC CELLS, AND CELLS CONTAINING THEM

FIELD OF THE INVENTION

This invention relates to rechargeable, or primary, alkaline manganese dioxide cells having zinc anodes. In particular, this invention relates to the anodes prepared for such cells, and specifically to anodes for rechargeable alkaline manganese dioxide cells which are zinc-limited and where the zinc anode contains a small portion of metallic or elemental copper.

BACKGROUND OF THE INVENTION

It is generally desirable with rechargeable alkaline manganese dioxide-zinc cells for them to be zinc-limited. That means that the capacity of the cathode and the capacity of the anode are chosen such that the zinc is completely used up before the useful reversible portion of the manganese dioxide capacity is exhausted. If manganese dioxide is discharged beyond the reversible capacity, its characteristic of being rechargeable would, to all intents and purposes, be destroyed. The issue of rechargeable alkaline manganese, and the pre-reduction of the material for the cathodes, are discussed in a U.S. Patent assigned to the same assignee as this application, namely U.S. Pat. No. 5,011,752, issued Apr. 30, 1991.

As is well known, a rechargeable manganese-zinc cell has the basic structure of a cathode which is comprised substantially of manganese dioxide, an anode having zinc particles included in its composition, an aqueous alkaline electrolyte, a current collector in intimate physical contact with the anode, a container for the cell, and a separator which physically is located between the anode and the cathode and which electrically insulates them from each other. The separator is at least partially wettable by the electrolyte; and in keeping with the present invention, at least one layer of the separator is an ion permeable membrane which is otherwise unpenetrable by particles such as zinc dendrites.

In keeping with a particular aspect of the present invention, the anode is prepared in such a way that it contains zinc particles, zinc oxide, and an amount of finely divided precipitated copper—metallic or elemental copper—which is in a manner deposited on or between the zinc particles in such a way that it establishes an electrically conductive, low resistance structure within the structure of the anode. Put in other words, the metallic or elemental copper provides an interconnecting metallic structure which has a sponge-like appearance and characteristic, but which is otherwise structurally integral. This feature is important to the life of the cell, especially its shelf-life over a prolonged storage, whether the cell is primary or secondary in nature.

However, particularly in the case of a secondary cell, the metallic copper structure within the zinc node remains in place after the zinc metal powder has been used up during discharge of the cell, and it remains in place for redeposition of new zinc during the charge cycle which will follow.

On the other hand, if the cell is overcharged, the copper acts as a catalyst—indeed, a very active catalyst—which is in intimate contact with the recharged zinc. Thus, the matter of the oxygen recombination cycle which occurs locally around and within the anode structure is catalytically driven to recombine the oxygen without excessive oxygen gas evolution away from the anode.

It should also be noted that if the cell is extensively discharged or over-discharged, the finely divided metallic or elemental copper can be oxidized to become copper oxide, thereby preventing oxygen gassing if the cell reaches cell reversal.

PRIOR ART

The prior art includes, particularly, the reference book "BATTERIES", Volume 1, edited by the inventor Kordesch herein. Several teachings of that book are referred to below. The prior art also includes Kordesch, U.S. Pat. No. 4,091,178 issued May 23, 1978, which is discussed below.

For purposes of the discussion in this application, it will be taken as well known—see Kozawa, in "BATTERIES" above—that the use of manganese dioxide as an active cathode material in a rechargeable alkaline secondary cell is only possible if it is recognized that only the one electron-discharge capacity can be utilized for efficient recharging of the cell. This is particularly true in the presence of highly conductive alkaline electrolytes. If the cell is discharged beyond that limit, irreversible damage occurs to the manganese dioxide structure.

If such a cell is provided with a zinc anode having a capacity equal to or higher than the capacity of the manganese dioxide cathode, then discharge of the cell would have to be terminated at about 1.0 volt, and the cell recharged. This requires the use of a voltmeter or other control; and while some batteries having such provisions were marketed by Union Carbide under its EVEREADY trade mark in the early or mid 1970's, they proved to be cumbersome and unreliable.

To overcome the problems discussed above, the practice of "zinc limitation" is followed. This is discussed in the book "BATTERIES", and is explained quite simply. If the zinc anode has a pre-determined capacity, even though there may be active manganese dioxide left in the cathode, the cell cannot be discharged further after the zinc anode has been depleted. The voltage of a single cell would go to zero if it remains connected to a load. If the cell is connected in series with at least two more cells which may still have some ampere-hour capacity in them, then the exhausted cell is subjected to reverse polarity if it remains connected to the load and in series with the other cells.

The practical application of zinc limitation is, however, not easily attained. Zinc-limited powder zinc anodes are notoriously inefficient; and if a gelling agent is used to immobilize the electrolyte, the gel may trap as much as 30% of isolated and therefore unused and unusable zinc particles.

Usually there are about one to six percent of amalgamated powder zinc used in a zinc anode. If it is completely discharged, then only the zinc oxide and mercury droplets are left behind. Zinc oxide is not conductive, and it forms a paste-like mass around the current collector of the cell—which is usually a wire or nail placed in the center of the anode. This means that the current collector is isolated from any active zinc that may remain in the anode by the non-conductive zinc oxide.

Moreover, after the cell has been charged and discharged over several cycles, there may occur a change in the shape—or, at least, a tendency for there to be a change in shape—of the anode. This is because in each cycle, the newly deposited zinc which is restored back in the anode during charge, may be mercury rich at the bottom of the cell if it is not disturbed in its orientation. This may result in dense zinc lumps, and a non-uniform current distribution, throughout the anode.

In order to overcome the problem noted immediately above, it has been proposed to make the provision of a collector system such as a mesh or "cage" consisting of a copper screen. This is particularly described in Kordesch U.S. Pat. No. 4,091,178 noted above. There, amalgamated zinc particles are carried on a screen, in an amount which gives a limited anode discharge capacity which is about one-third of the cathode capacity. However, the patent teaches the use of a charge reserve mass of an oxide or hydroxide of zinc, in an amount sufficient to provide charge reserve capacity of at least 50% of the anode discharge capacity. That patent also teaches the use of copper particles, but they have been found to be detrimental as they cause excessive gassing within the cell.

The present invention, on the other hand, has shown that a small amount of metallic or elemental copper in the form of a spongy structure within the anode, formed and deposited as discussed hereafter, shows no sensitivity to gravity and thereby precludes shape change, it requires only a center collector and no additional copper screen mesh or cage, successfully precludes excessive gassing, provides a less costly cell, and at the same time provides a cell having a higher ampere-hour capacity than previously. The comparisons are with respect to cells made in keeping with the Kordesch patent noted above, or as discussed hereafter.

The present invention provides, quite unexpectedly, that an analytically determined amount of about 1–10% by weight of metallic or elemental copper within the composition of the zinc anode is sufficient to achieve all of the results noted immediately above. The present invention also provides processes for preparing the anode mass either for immediate insertion into a cell, or for storage.

Another feature of the present invention is that the low content of copper within the cell is easily and completely amalgamable, using quite small amounts of mercury. This provides for many years of shelf life of the cell, by precluding zinc corrosion, and it permits stability of the cell even at elevated temperatures of up to 65° C. What the present invention provides, therefore, is a rechargeable alkaline manganese dioxide cell having a manganese dioxide cathode and a zinc anode, having a small quantity of metallic copper which is finally divided and is such as to have a large surface area. In that manner, copper is distributed throughout the anode and forms an electrically conductive, low resistance structure, within the anode. By these provisions, a cell is provided that exhibits an overcharge reserve because of the presence of a sufficient amount of zinc oxide in the anode composition admixture; and at the same time, the cell exhibits an overdischarge reserve because of the presence of metallic copper in the anode composition admixture.

The large surface area metallic copper may be present in the anode in the range of from about 1%–12%, generally in the range of about 2%–10%.

The present invention contemplates a number of different physical embodiments or placements of the cathode and anode elements within a cell. For example, the usual configuration of cylindrical cell, with the cathode being in the form of a ring and the anode located within the ring, is clearly a preferred embodiment as discussed hereafter. However, the cell might be made in the form of a spiral, with the cathode being supported on a metal screen and the anode including a non-conductive screen. The cell might also be made in the form of plurality of interleaved plates; or, indeed, it may be formed with bipolar plates. In the latter instance, each bipolar plate comprises a two-sided conducting foil which is compatable with the zinc of the anode on one side of the foil and which is compatable with the manganese dioxide of the cathode on the other side of the foil.

In all events, the separator, which is very often a two component separator, but which in any event is at least partially wetted by the electrolyte, is physically placed between the anode and the cathode of a cylindrical cell, or in a jelly roll, or between adjacent cathode and anode plates in a plate cell. In keeping with the present invention, the separator should comprise at least two discrete layers. The first of those layers, which is the one which is in physical contact with the anode, must exhibit ion-permeable characteristics, but be unpenetrable by particles such as zinc particles and/or zinc dendrites. The second layer must be non-oxidizable, and must be capable of absorbing or wicking (or otherwise being wetted by) the aqueous alkaline electrolyte. Typically, the first layer may be a regenerated cellulosic material, such as cellophane or sausage casing material.

In any event, the cathode may generally comprise an admixture of electrolytic manganese dioxide, together with about 5%–15% of graphite for purposes of enhancing the internal conductivity of the cathode. Moreover, the cathode may comprise certain inorganic or organic binding substances such as Portland Cement or polysulfone. It is also contemplated that, in some instances, earth-alkali hydroxide such as 4% calcium hydroxide or barium hydroxide may be included, to assist in precipitating ZnO from the electrolyte. To improve the moulding capabilities of the cathode mass, a very small amount such as about 0.5% of polyethylene may also be included.

Indeed, it is also possible for there to be a small amount of water or electrolyte to be added to the cathode, which facilitates the pressure moulding of the cathode mass, particularly for cylindrical cells. In cylindrical cells, whether primary or secondary, very often the cathode is in the form of an extruded sleeve, or a plurality of discs or rings.

The present invention also provides for several processes for the preparation of the zinc anode, particularly in keeping with the present invention. According to the present invention, zinc anode material containing a small amount of elemental or metallic copper may be prepared using chemical or electrochemical reactions, either for immediate insertion into the cell or for storage and later use. In the latter use, a copper coated zinc powder is first prepared, and the gelled anode mixes may be prepared at a later time.

One of the processes provided by this invention involves the steps of reacting copper oxide material with amalgamated zinc powder in the presence of a strong alkaline solution, while continuously stirring the mixture being formed; and also excluding air from reaching the reacting mixture. That process may be carried out under an elevated temperature of between 35° C. and 95° C., usually in a hot water bath.

The above process may be followed by cooling the mixture to room temperature and adding a gelling agent to the mixture, while continuing to exclude air from it.

The mixture may be set aside and observed to ensure that no gas evolves therefrom, thereby assuring complete viscosity equalization of the gelled mix. The processes discussed above may be carried out by flooding the area of the reacting mixture with nitrogen, so as to exclude oxygen.

It is noted in the invention that amalgamated zinc may be substituted by non-amalgamated zinc, together with the mercury equivalent of mercuric oxide.

If it is desired to store the reacted mixture, then the gelling agent is not added to it. Instead, the first steps noted above, up to and including cooling the mixture, are carried out and then the mixture may be dried. Preferably the mixture is first washed.

If the reacted mixture is washed, it is convenient to wash it with warm alkaline solution and then with water until it is substantially free of caustic. Thereafter, the washed reacted mixture may be dried under a vacuum.

In another, electroless process according to the present invention, zinc powder may be immersed into a copper complex solution such as Rochelle salt. It is then reduced, using a reducing gent such as formaldehyde (additionally, ammonium vanadate may be used as a catalyst) and then the mixture may be washed with acetone. Thereafter, the mixture may be dried under a vacuum.

Yet another process provided by the present invention is a cementation process which comprises the immersion of zinc powder into an aqueous solution containing a copper salt, whereby copper deposit is formed on zinc powder particles. Thereafter, the copper deposited zinc powder may be washed and then dried under a vacuum. The zinc powder may also contain at least one metal, such as mercury, lead, and cadmium, which thereafter provides a corrosion depressant in the anode being produced.

BRIEF DESCRIPTION OF THE DRAWINGS

The present invention will be discussed below, with reference to several figures that accompany this discussion for purposes of illustration, and in which.

DETAILED DESCRIPTION OF THE PREFERRED EMBODIMENTS

Figure 1:
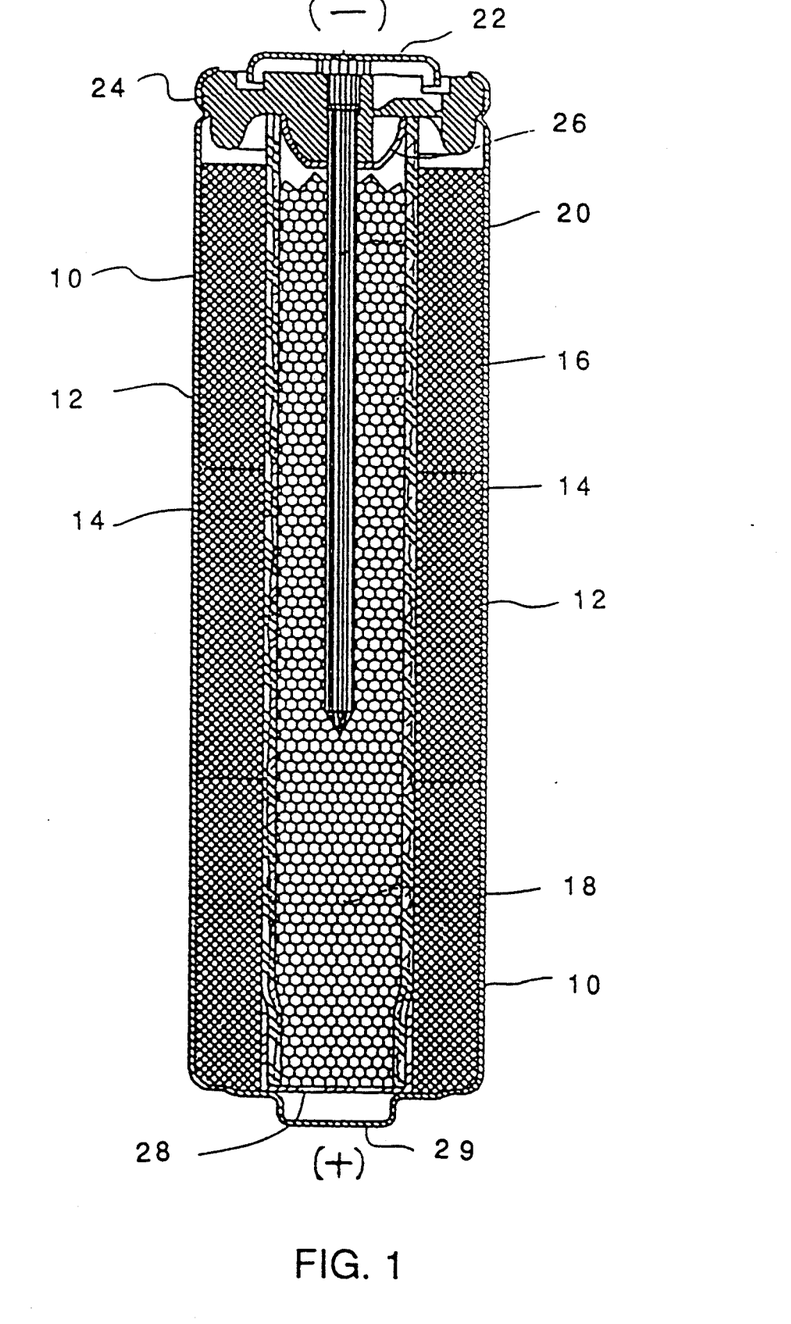
FIG. 1 is a cross section of a typical cylindrical cell according to the present invention.

Referring first to FIG. 1, which is a typical cross section of a cylindrical cell made in keeping with this invention, the cell is shown in the orientation that it assumes when it is first manufactured—that is, with the pipe or positive terminal down, and the negative terminal of the cell in the upper end thereof. The cell has a steel can 10, usually of nickel plated steel. Within the can there is a cathode 12, the specific nature of which is immaterial to the present invention, but which in any event comprises a substantial amount of electrolytic manganese dioxide. A separator is shown, and in this embodiment it is shown as having two discrete components 14 and 16. The outer, cathode side of the separator, layer 14, is preferably a fibrous material having absorbing or wicking properties with respect to the potassium hydroxide (KOH) electrolyte to be used in the cell. The inner layer 16 is an ion permeable material which may be such as a regenerated cellulosic material such as cellophane or even sausage casing material. The ion permeable layer 16 is such that it is not penetrable by particles such as zinc dendrite particles as they may develop during operation of the cell.

The anode of the cell is essentially a powder zinc mass shown at 18.

Centrally located within the anode mass 18 is a current collector 20. The current collector is, in this case, shown in the form of a "nail", but it may be a wire embedded in the anode mass. It will be noted that the current collector 20 contacts the end terminal plate 22 of the can, providing the negative terminal for the cell; the cathode 12 is in intimate contact with the interior surface of the can 10, of which the pipe 29 at the bottom end is a portion, thereby forming the positive terminal for the cell.

The cell is sealed by a closure 24, over which the upper ends of the open end of the can are crimped. 26 and 28 are plastic washers, in this embodiment, preventing electric short circuiting of the cell.

The composition of the cathode 12 is generally that it comprises electrolytic manganese dioxide. To that, however, there may be added from about 7 to 15% graphite, to establish conductivity within the cathode; and there may be other additives such as a small amount of polyethylene to improve the moulding characteristic. Other material such as inorganic or organic binding substances, for example, a small amount of Portland Cement or polysulfone, may be included in the cathode mix; and so also might certain earth-alkali hydroxides such as calcium hydroxide or barium hydroxide to assist in precipitating ZnO from the electrolyte.

The cathode may be extruded or pressed, and it may comprise one or a number of tubes or rings placed within the can 10. It is also known to add a small amount of water or even potassium hydroxide electrolyte to the cathode mixture, to permit its pressure moulding or compaction.

The cell, as described above, may be a primary cell; but more particularly the present invention is directed towards secondary cells, where overcharge and overdischarge reserves are desireable.

As to the anode of either a primary or a secondary cell, its composition and preparation are the principal subjects of the present invention.

As discussed above, the electrochemical capacity of an anode is determined by the zinc content. A number of commercially available zinc powders, usually having particles in the range of between 35 and 100 mesh Tyler screen sizes, and in various levels of amalgamation, may be utilized. Such zinc powders are available to the primary cell industry. The amalgamation levels may be in the range of from 1 to 6% of mercury content.

Indeed, non-amalgamated zinc powder may be used, and it may be amalgamated by adding the mercury equivalent of metallic mercury or mercuric oxide in the presence of a caustic solution such as potassium hydroxide or ammonium hydroxide.

Figure 4:
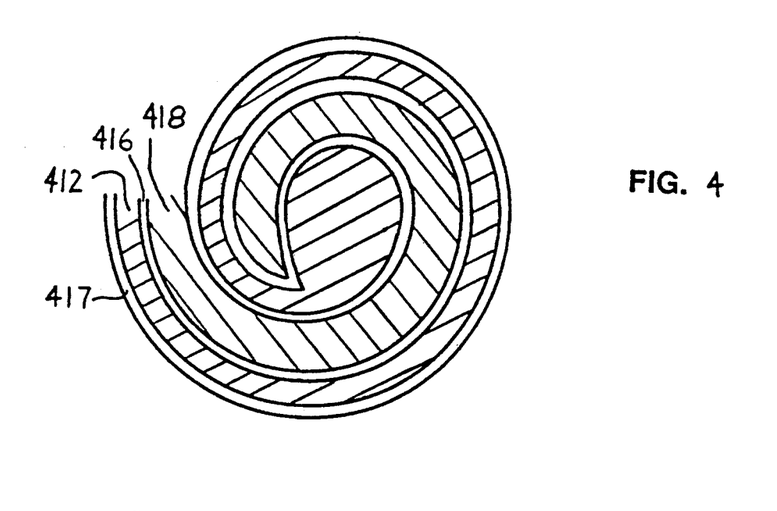
FIGS. 4, 5, and 6 are schematic drawings showing typical alternative embodiments of cells in keeping with the present invention.
Figure 5:
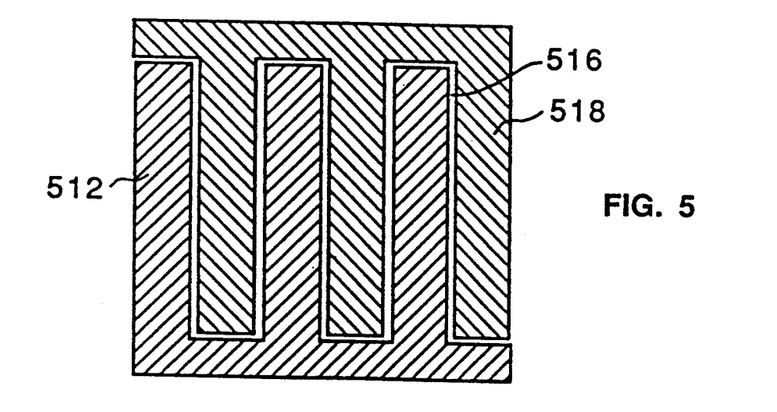
Figure 6:
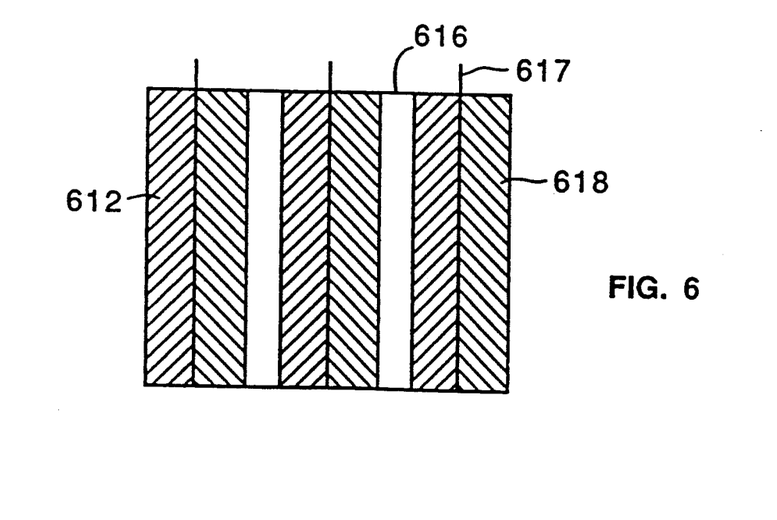

Alternative embodiments of cells that may be made in keeping with the present invention are shown in each of FIGS. 4, 5 and 6. In FIG. 4, it is contemplated that the cathode and anode may be wound in a spiral fashion.

Thus, a cathode 412 and an anode 418 may be wound with a separator 416 between them. Another separator 417 is shown as well, it being understood that the separators 416 and 417 are made in any event to have an ion permeable portion facing the anode 418 and an electrolyte absorbent or wetting characteristic particularly on the side facing the cathode 412.

FIG. 5 contemplates a structure having interleaved plates which may be structurally integral or in any event connected to their separate plate headers or current collectors. For example, there may be a plurality of interleaved cathode plates 512 and anode plates 518, separated in each instance by separators 516 having the same characteristics as discussed above.

It is contemplated, generally, that the cathodes 512 may be supported on a metal screen, and that the anodes 518 are supported on a non-conductive screen—usually a plastic screen.

FIG. 6 contemplates a plurality of bipolar plates, each having a cathode 612 on one side and an anode 618 on the other side of a two-sided conducting foil. The side of the conducting foil which faces the zinc anode 618 must be compatible with the zinc, and the side of the conducting foil 617 which faces the manganese dioxide cathode must be compatible with that composition. The conducting foil, of course, comprises the current collector of such a cell.

Preparation of the Anode Mass

An amalgamated zinc powder may be reacted with copper oxides. Either CuO or Cu2O may be used, depending on the desired equivalent copper content and the final zinc oxide level. The following expressions show how the zinc mass may be created; the amount of zinc surplus which provides the anode capacity for the cell. The production of the zinc (x Zn) may be in keeping with either of the following reaction formulas:

$$CuO + Zn + x\ Zn = Cu + ZnO + x\ Zn \quad \text{(Eqn. I)}$$

$$Cu2O + Zn + x\ Zn = 2\ Cu + ZnO + x\ Zn \quad \text{(Eqn. II)}$$

The above reaction is carried out in fairly strong potassium hydroxide solution, being usually 9 normal or 12 normal KOH solution. The reaction, in each instance, is exothermic.

The following procedures are followed:

First, a mixture is made of the zinc powder together with the potassium hydroxide. Then, small amounts of the copper hydroxides (either form) are added to the zinc powder/KOH mixture, which is continuously mixed. It is important to exclude air from the reacting mixture, and this may be accomplished by the expedient of flooding the area over the reacting mixture with nitrogen.

The reaction may take a few hours at an elevated temperature, in the range of 35° C. to 95° C., and may be conveniently carried out by placing the reacting mixture in suitable containers in a water bath. After the reacting mixture is finally formulated, and continuously stirred, it is then allowed to cool while still having air excluded from it such as being beneath a nitrogen blanket. Indeed, the mixture is generally stored under the same protective atmosphere.

It is possible that there may be some gas evolution, so that a tightly closed container is generally to be avoided. A gelling agent, such as the commercial product sold in association with the trade mark CARBOPOL, or certain formulation of carboxymethyl cellulose (CMC) may be added to the reacted mixture, preferably at room temperature. At that time, it is necessary for the viscosity of the reacted anode mixture to equalize, and this may take up to 24 hours. The mixture is observed for gas bubbles, and if they occur the mixture may be de-gassed such as by placing it under a vacuum. Finally, the gelled and gas-free mixture may be transferred to the reduction machinery for extruding directly into the anode cavity of the cells being manufactured.

The present invention also provides for the preparation of zinc powder having copper admixed to it, by several different processes, where it is intended for the copper containing zinc powder to be stored. In those instances, the cell anode per se is not finally formulated, and no gelling agent is included in the zinc/copper mix.

First, the steps noted above up to and including cooling the mixture may be carried out. Then, instead of adding gelling agent, the mixture of copper and zinc may be washed with a warm and more diluted potassium hydroxide, than with water. The mixture is washed until it is essentially free of caustic, and then may be dried in a vacuum. The mixture must be kept free from air, which must not be allowed access to it.

An electroless process may be carried out in which zinc powder (which may alternatively have fibres of plastic, ceramic, or graphite admixed with it) is immersed into a copper complex solution. That solution may be NaK-Tartrate (Rochelle salt). The zinc powder (or powder and fibre)/copper complex solution is then reduced at an elevated temperature of about 50° C. to 90° C. (usually about 75° C.) with a reducing agent such as formaldehyde. Thereafter, it is washed and dried in a vacuum. If acetone is used for washing the reacted product, the drying process is accelerated.

A cementation process is also provided, by which an aqueous copper salt solution such as copper sulphate is used. Here, zinc powder is immersed into the aqueous solution, so that copper is deposited on the zinc powder particles because of the higher negative potential of the zinc, in keeping with the following formulation.

$$Cu\text{-ions} + Zn\text{-metal} = Cu\text{-metal deposit on } Zn \quad \text{(Eqn. III)}$$

The copper deposited zinc powder may then be washed and dried under a vacuum. Also, the zinc powder may contain at least one other metal such as mercury, lead or cadmium, which act as a corrosion depressant in the anode after it is produced.

The copper coated zinc powder which is formed according to any of the processers described above is generally to be stored in a closed container. The colour of the copper coated zinc powder may vary from dark red to grey, depending on the mercury content of the zinc powder (its amalgamation level).

In any event, the copper percentage of the dry copper coated zinc powder should be determined, because it will serve as a guide when the cell anode is prepared at a later date. Discussions of the effect of copper content of the zinc anode formulation are made below.

Figure 2:
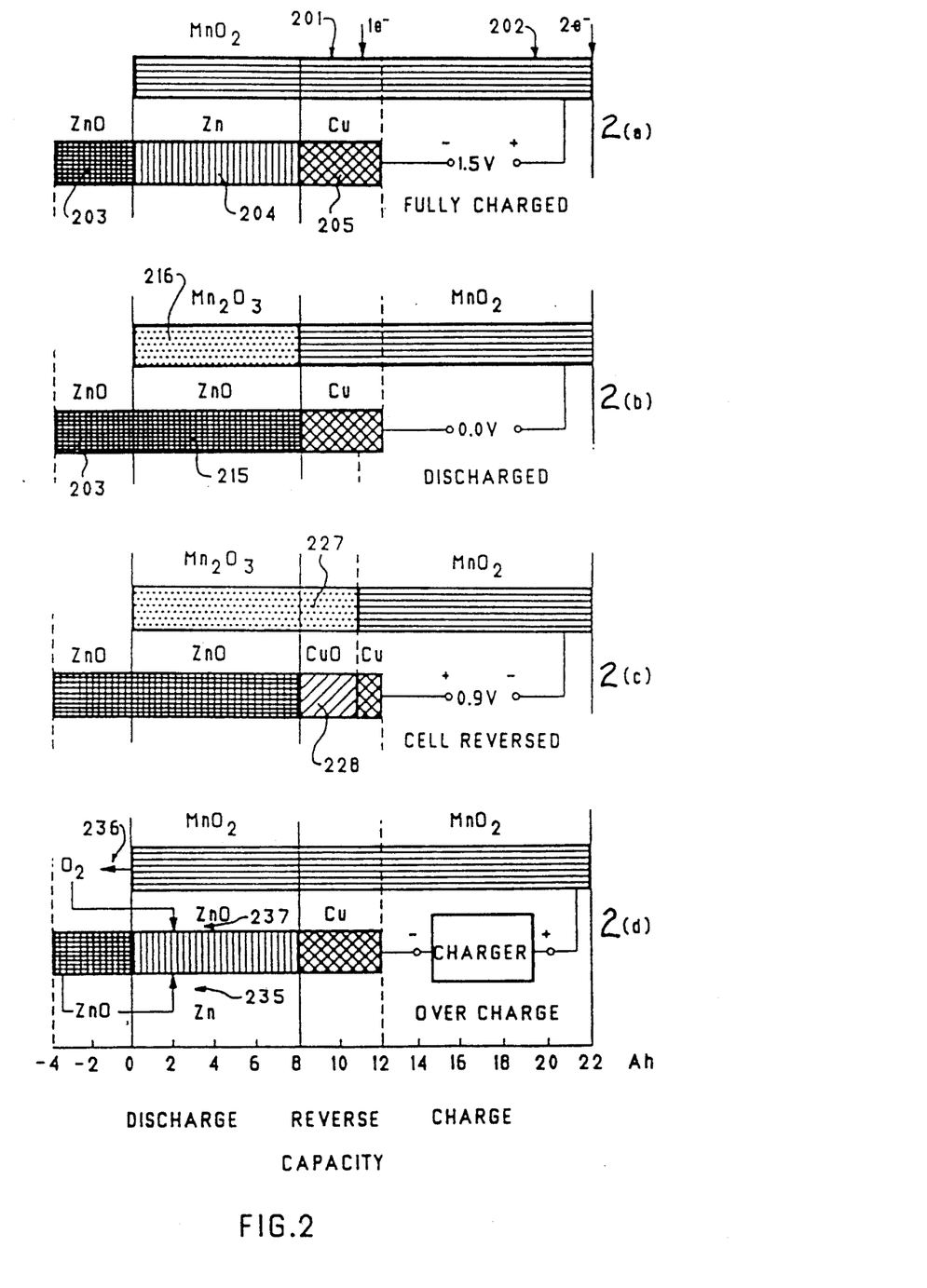
FIG. 2 shows four different cases of the stoichiometric electrode balance of a cell such as that shown in FIG. 1.
Figure 3:
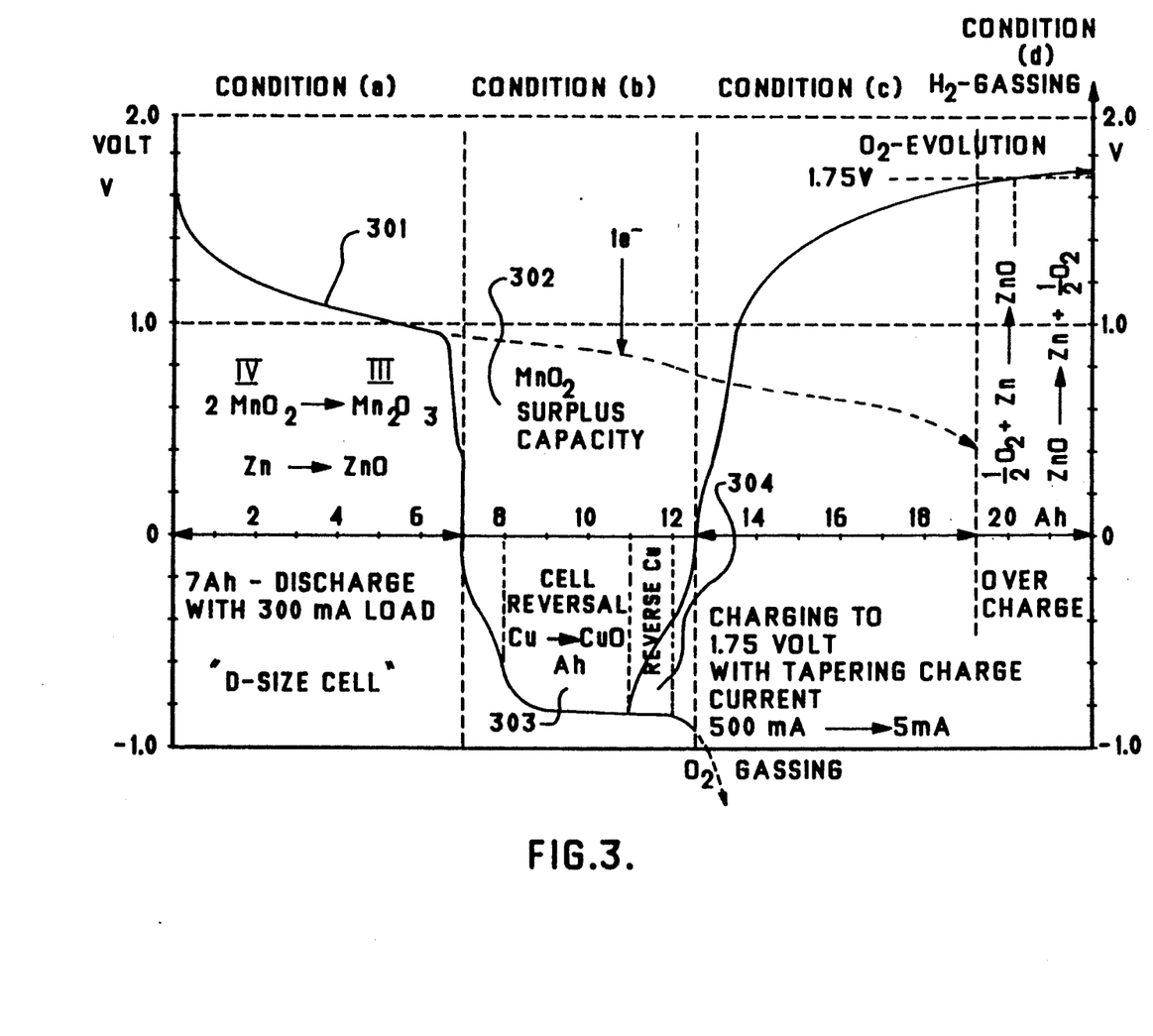
FIG. 3 shows a voltage and capacity diagram corresponding to the specific charge/discharge conditions shown in FIG. 2.

Discussion of FIGS. 2 and 3

As noted above, FIG. 2 illustrates four different cases of the stoichiometric electrode balance of a cell, particularly a cell such as that which is the cylindrical cell shown in FIG. 1. FIG. 3 is a voltage and capacity diagram corresponding to the specific charge/discharge conditions that are shown in FIG. 2. What now follows, in particular, is a discussion of FIG. 2.

What is shown particularly in FIG. 2 is the relative electrode capacity changes that may occur during the cycling of a zinc-limited manganese dioxide-zinc cell, where the zinc anode contains metallic or elemental copper having a large surface area, all as discussed above.

It is understood, of course, that the zinc and the manganese dioxide are the only active materials in the working cell. In a working condition, it is the manganese dioxide which is reduced, and the zinc which is oxidized. The effect of the copper is discussed below. The bar graphs illustrate the changes in the active electrodes; the discharge, reverse, and charge conditions of the electrodes in respect of their capacity being noted.

Having regard to FIG. 2 (a), the cell is fully charged. Here, it will be noted that the one electron and the two electron levels of the manganese dioxide are noted at 201 and 202; and the amount of zinc oxide, zinc, and copper in the anode are noted at 203, 204, and 205. It is the amount of zinc which determines the usable capacity of the cell. In this case, it is seen to 8 ampere hours; and the voltage between the anode and the cathode is 1.5 volts.

Having regard to the reaction which occurs in the cell, the following equation shows the reaction when there is surplus manganese dioxide available:

$$2\ MnO2 + y\ MnO2 + 2\ Zn = 2\ ZnO + Mn2O3 + y\ MnO2 \qquad \text{(Eqn.IV)}$$

From the above, it will be seen that the amount of excess manganese dioxide remains the same, but that all of the zinc is oxidized and the remaining amount of manganese dioxide is reduced to Mn2O3.

Referring now to FIG. 2(b), it is seen that the cell is fully exhausted. All of the zinc has been oxidized to zinc oxide as shown at 215; some of the 4-valent manganese dioxide remains as MnO2; but other, of the manganese has been reduced to 3-valent manganese in the Mn2O3 at 216. The voltage between the cathode and the anode is zero.

A stoichiometric analysis of equation IV above, shows that only half of the Mno2 should have been used (y=2x), when the cell has reached its zero volt level. All of the copper in the anode is in the metallic state and it is amalgamated. Observation has shown that the amalgamated copper has what appears to be a spongy structure, resembling a sponge having large surface area; and that the copper extends throughout the anode mass. Of course, by now the anode mass is now mainly zinc oxide, still having a gelled electrolyte distributed within it.

Now, having regard to FIG. 2(c), stoichiometric analysis is made in the event that the cell is over-discharged. If any exhausted cell is connected in series with at least two more cells, and they are not exhausted, and the load is kept on, then the exhausted cell will be reversed in its polarity. In that state, the zinc electrode becomes positive and the MnO2 electrode becomes the negative terminal. In this state, it would be expected for there to be an electrolysis effect now to occur, by which hydrogen should evolve on the negative terminal as it now appears—the cathode—and oxygen should evolve on the positive terminal as it now appears—the anode. However, no gassing occurs. What happens, instead, is that the MnO2 is further reduced as at 227, so no hydrogen evolves; and the copper is oxidized as at 228, so no oxygen evolves. For purposes of a practical discussion, it is assumed that about 10% to 33% of the normal cell capacity is sufficient to provide a reversal capacity as contemplated in FIG. 2(c). It is believed that this is sufficient to allow for non-uniformities in a multiple cell arrangement, and there should be no cell damage observed after recharging.

When the cell is charged, first the copper oxide is reduced back to copper, then the zinc is deposited on the copper sponge which exists as described above. In that condition, the voltage may then begin to build up in the correct direction. Usually, regular charging of the manganese dioxide-zinc cell would then proceed until the terminal voltage reaches approximately 1.7 volts, at which time the situation described with respect to FIG. 2(a) is again reached.

FIG. 2(d) describes the situation if the cell is overcharged. Here, the zinc oxide serves as a charge capacity reserve, which makes evolution of hydrogen of the zinc impossible. However, if overcharging is continued, for example in the event that a timer or voltage sensor fails, or an oversight occurs that the charger is not disconnected, zinc oxide will continue to be converted to zinc as at 235; and at the same time, oxygen gas is evolved at the cathode as at 236. This oxygen gas may pressurize the cell to some extent, and by so doing it is sufficiently mobile so as to pass over to the metallic zinc of the anode, where once again zinc oxide is produced as at 237. This chemical cycle converts the charged electricity—the over capacity being put into the cell—into heat, but it does not change the electrode balance of the cell after a fully charged state has been reached.

The above circumstance generally corresponds to the principals behind the overcharged oxygen cycle of a nickel cadmium battery. Accordingly, the overcharged cycle noted above should only be carried out at low current or under taper charging conditions. At least the charger should be designed so as to substantially reduce the charged current as the terminal voltage of the charged cell approaches 1.7 volts, so that a trickle charge may create some heat within the cell but otherwise does not cause cell damage.

Referring now to FIG. 3, the various voltage and capacity conditions are shown corresponding to those of FIGS. 2(a), 2(b), 2(c) and 2(d). In FIG. 3, voltage is shown on the vertical axis, and capacity of the cell is shown on the horizontal axis.

What is seen is the voltage characteristic of the cathode relative to the anode shown at 301, dropping to zero at about 7 ampere hour discharge condition for the cell noted, and falling to as low as about 0.8 volts (negative) in cell reversal conditions. However, before oxygen gassing may occur, charging will reverse the cell polarity to its normal condition, and the cathode voltage rises to the range of about 1.75 volts at which time in overcharge there may be some oxygen evolution. The hydrogen gassing condition is not reached.

The effect of the surplus capacity of manganese dioxide is noted at 302; as well s the oxidizing of copper in the cell reversal condition at 303 with there being still some reserve copper possibly remaining within the cell as at 304.

PERFORMANCE CHARACTERISTICS

The following discussion reveals the characteristic performance of copper containing anodes in keeping with the present invention. Several tables are given below, showing specific performance characteristics of differing anode compositions—where not all anode compositions are discussed in respect of each of the performance characteristics being reviewed in the various tables. The tables present data (average data taken from representative samples) in respect of such characteristics as: short circuit current (Table 1); Ampere-hour capacity and % zinc utilization (Table 2); and increase of volume of anode composition gels vs. time and temperature.

TABLE I

Short Circuit Current (Amperes) of D-size Cells in different States of Discharge. 0% Dis. = Fully charged

| Anode description: | 0% | 50% | 75% | 90% |
|---|---|---|---|---|
| Screen + Zn powder + 30% Cu: | 25 A | 22 A | 14 A | 10 A |
| Screen + Zn powder + 10% Cu: | 25 A | 20 A | 12 A | 8 A |
| Screen + Zn powder, no Cu: | 25 A | 18 A | 10 A | 6 A |
| Cu-Nail + Zn powder, no Cu: | 25 A | 12 A | 6 A | 2 A |
| Cu-Nail + Zn powder + 10% LSD-Cu: | 25 A | 18 A | 12 A | 8 A |

The above Table shows the comparative short circuit current of D-sized cells with or without a copper screen, and with or without an addition of metallic copper; and two additional comparisons of an anode having a copper nail but no Large Surface Deposit (LSD) copper, and an anode having a copper nail and 10% LSD copper.

The internal resistance of a cell is manifested by the short circuit current that it may produce; the higher the internal resistance, the lower the short circuit current. It will be noted that the use of 10% LSD copper is essentially as effective as the use of 10% metallic copper plus a copper screen, and nearly as effective as 30% metallic copper plus a copper screen. Clearly, to eliminate a screen presents considerable savings in cost of manufacture and material costs, and provides somewhat more internal volume for active material within the cell. Moreover, the use of higher copper content—either metallic copper and/or the screen—requires addition and greater amounts of mercury for amalgamation of the copper.

It will also be noted that the addition of 10% LSD copper shows that there is considerably lower internal resistance than with no copper, and nearly the same as with a copper screen; the significance being that with the sponge-like copper network or matrix developed within the anode, even when the cell is substantially exhausted the internal resistance of the cell at the anode is considerably lower than it would have been without the copper matrix remaining in the anode. Still further, as a cell is completely discharged except for a few isolated zinc particles, and has no copper within the anode, its internal resistance may rise to as much as 50 Ohms, thereby severely limiting the capability of the cell to accept an initial charge current.

TABLE II

| Ah-Capacity and % zinc utilization of a D-cell on 4 OHm load | | | |
|---|---|---|---|
| Cell Construction Anode Description | Actual Cell Ah | Zn content Theoret.Ah | Zinc efficiency |
| Screen + Zn powder + 30% Cu: | 5.0 | 6.5 | 75% |
| Screen + Zn powder + 10% LSD-Cu: | 6.0 | 8.0 | 75% |
| Screen + Zn powder, no Cu: | 6.0 | 10.0 | 60% |
| Cu nail + Zn powder + 30% Cu: | 5.0 | 7.0 | 70% |

TABLE II-continued

| Ah-Capacity and % zinc utilization of a D-cell on 4 OHm load | | | |
|---|---|---|---|
| Cell Construction Anode Description | Actual Cell Ah | Zn content Theoret.Ah | Zinc efficiency |
| Cu nail + Zn powder, no Cu: | 5.2 | 10.5 | 50% |
| Cu nail + Zn powder + 10% LSD-Cu: | 6.3 | 9.0 | 70% |

In the above Table, either a copper screen or a copper nail is used together with three different zinc/copper combinations; zinc powder with 30% metallic copper, zinc powder with 10% LSD copper, or zinc powder with no copper.

The zinc efficiency of anode compositions according to the present invention is clearly shown in the above Table.

TABLE III

Increase in volume (ml) of 20 ml Zinc Powder KOH-NaCMC-Gels containing copper, as a function of Time and Temperature

| Test Temperatures: | 20 Deg. C | | 65 deg. C | |
|---|---|---|---|---|
| Type of copper anode: | 30% | 10% LSD | 30% | 10% LSD |
| 1 Day standing time = | 0.1 | 0.1 | 0.5 | 0.2 |
| 1 Week standing time + | 0.5 | 0.2 | 2.0 | 0.5 |
| 3 Weeks standing time + | 2.0 | 0.3 | 8.0 | 2.0 |

The above Table demonstrates the corrosion behaviour of the anode mass, comparing it to an anode having a high metallic copper content and a copper screen collector.

As mentioned above, there is less mercury required in a cell having an anode according to the present invention. Moreover, there is no separate amalgamation step required so as to amalgamate the large-surface deposit copper with the amalgamated zinc.

Table III shows the gassing behaviour or gelled anodes. Tests are done using 50 ml round glass vials, each having a 15 mm diameter. The vials are calibrated in fractions of ml. The zinc was 6% amalgamated; and as noted, the tests were made at 20° C. and 65° C. The tests were carried out with 9-molar potassium hydroxide.

The increase of volume of the zinc composition is clearly noted; and in each instance, the increase is considerably less with an anode composition in keeping with the present invention.

Having regard to FIGS. 2 and 3 discussed previously, further explanations of the gassing conditions of the cell are now discussed. During some gassing tests, it was noted that the oxygen of the air above the anode mixes was rapidly used up, so that a negative pressure developed and only remained above the anode mixes. Thereafter, further tests were made under nitrogen so as to assure accuracy of the measurements being made.

What was confirmed was that the regular zinc powder gels having potassium hydroxide in the composition did not absorb oxygen from the air as readily as similar gels containing large surface deposit copper. Clearly, the oxygen cycle is promoted by the copper in the finely divided, large surface form, and/or deposited on the zinc itself. It is postulated that the copper forms an intermediate $Cu_2O$ with the gaseous oxygen, and that $Cu_2O$ is immediately reduced by the zinc, thereby forming zinc oxide.

In that circumstance, it can be considered that the copper functions as a catalytic additive. It follows that cells having copper containing anodes should be particularly well sealed, so as to avoid ingress of oxygen from the air which would reduce its shelf life.

Examples

EXAMPLE 1

An anode mix having the following composition is prepared:

| Zinc Anode Composition | |
|---|---|
| 6% amalgamated zinc powder | 100 ppw |
| Cu(II) oxide or Cu(I) oxide | 10 ppw |
| 12 normal KOH | 60 ppw |

The oxide (either one) is added incrementally to the zinc/KOH solution; the solution is heated for six hours at 60° C. to 80° C. in a moderate vacuum.

Then, after the mixture has cooled down under nitrogen, 3 ppw Na-carboxy methyl cellulose (Na-CMC) are added; and the mixture is permitted to gel overnight. The following day, the gelled mixture should have a grey colour and the consistency of thick toothpaste; it should not have a red colouration.

Adjustments can be made by varying the amount of liquid potassium hydroxide that is used, either more or less.

EXAMPLE 2

The amalgamated zinc powder and Cu(II) oxide—CuO—are mixed on a water bath at 60° C. to 80° C. Then they are reacted for six hours under nitrogen, and the mix is cooled to room temperature.

2 ppw Na-CMC and 2 ppw magnesium oxide are stirred into 40 ppw of 9 normal KOH until a uniform viscosity is obtained.

Thereafter, the zinc/copper and Na-CMC/MgO/KOH mixtures are mixed together under nitrogen, and a gelled anode mixture is thereby prepared.

EXAMPLE 3

In the place of CuO of Example 2, copper (I) copper—Cu2O—is used. This mixture has, after being reacted, twice as much metallic copper and zinc oxide than Example 1. The reversal capacity of a cell having this anode mixture is also doubled. Since more of the initial zinc powder is used up in the reaction, the electrode discharge capacity of the anode is correspondingly smaller. In that case, more zinc powder could be added later to the anode mixture, in order to obtain an anode having a higher capacity.

EXAMPLE 4

In this instance, any of Examples 1, 2, or 3 may be followed, except that the zinc powder is non-amalgamated. So as to produce an anode composition in keeping with the present invention, the amalgamation is effected by an admixture of mercury oxide (HgO) in the desired stoichimetric amount during the heating of the mix, as discussed previously.

EXAMPLE 5

Na-CMC may be replaced with a gelling agent available in association with the trade mark CARBOPOL. Additionally, mixtures of Na-CMC and CARBOPOL may be used, preferably in a ratio of about 60:40 of Na-CMC to CARBOPOL.

EXAMPLE 6

Following the procedure of Example 2, the resulting zinc powder mix which contains large surface deposit (LSD) copper may be washed with KOH and water, under nitrogen. Acetone may also be used at the end of the washing cycle. The washed zinc powder mix having LSD copper is then vacuum dried and stored. The copper content is determined by analysis, so as to formulate the gelled anode mixture desired; zinc oxide must be added at the time that the gelled zinc oxide mix is prepared for placement in cells.

EXAMPLE 7

Electroless plated zinc powder—that is copper coated zinc powder—is prepared as follows:

1 kg of non-amalgamated zinc is mixed into 2 liters of a solution. That solution contains 60 g of copper sulphate (CuSO4), 160 g Rochelle salt (NaK-tartrate) as a complexing agent, 124 ml of formaldehyde 10% (CH20) as a reducing agent, and 4 mg of ammonium vanadate—(NH4) VO3—as a catalyst. The pH of the mixture is adjusted with potassium hydroxide to become about 12 to 13.

The solution is heated to about 75° C., and the zinc powder is added to it slowly. The reacting mixture is continuously stirred until the colour turns from dark blue to grey. This plating reaction takes about 15 minutes. Thereafter, the copper coated zinc powder is washed with de-ionized water until the solution remains clear; and finally, the finished powder is washed with acetone and dried within a vacuum.

EXAMPLE 8

1 kg of amalgamated zinc powder is incrementally stirred into a diluted aqueous copper sulphate solution (having, for example, about 5–10% CuSO4). The solution is calculated so as to contain the amount of copper which is required to deposit from 3 to 10% by weight of copper onto the zinc. The solution is stirred until it becomes colourless, which indicates that all the copper has been deposited.

This process can be accelerated by heating. The pH value may be raised to about 2 to 4 using dilute sulphuric acid. Adding a soluble mercury salt, for example an acetate, produces a lighter coloured product having a high surface area copper.

After the reacted mixture is washed with water (and also acetone, to speed up the washing procedure) under nitrogen, it is dried in a vacuum, and the mixture may be stored for later use.

By knowing the copper content, any specific gelled zinc/zinc oxide anode mixture having finely divided copper having a large surface area within it, may be prepared for dispensing into a cell.

Experiments using various compositions as described above in the examples all show enhanced cell characteristics, as discussed and described above.

The scope of the present invention is defined by the appended claims.

We claim:

1. A primary or secondary alkaline manganese dioxide cell comprising:
   a cathode comprised substantially of manganese dioxide;
   an anode having zinc particles included in its composition;
   an aqueous alkaline electrolyte;

an ion-permeable separator physically located between and electrically insulating said cathode and said anode, said separator being at least partially wettable by said electrolyte;

a current collector in intimate physical contact with said anode; and a container for said cell;

wherein the composition of said anode comprises an admixture of amalgamated zinc particles, zinc oxide, and metallic copper;

and wherein said metallic copper is finely divided and has a large surface area, such that said copper is distributed throughout said anode and forms an electrically conductive, low resistance structure therein.

2. A rechargeable alkaline manganese dioxide cell comprising:

a cathode comprised substantially of manganese dioxide;

an anode having zinc particles included in its composition;

an aqueous alkaline electrolyte;

an ion-permeable separator physically located between and electrically insulating said cathode and said anode, said separator being at least partially wettable by said electrolyte;

a current collector in intimate physical contact with said anode; and a container for said cell;

wherein the composition of said anode comprises an admixture of amalgamated zinc particles, zinc oxide, and metallic copper;

said metallic copper being finely divided and having a large surface area, such that said copper is distributed throughout said anode and forms an electrically conductive, low resistance structure therein:

whereby said cell exhibits an overcharge reserve by the presence of a sufficient amount of zinc oxide in said anode composition admixture; and said cell exhibits an overdischarge reserve by the presence of said metallic copper in said anode composition admixture.

3. The rechargeable alkaline cell of claim 2, wherein said large surface area metallic copper is present in said anode composition admixture in the amount of about 1% to about 12% by weight of said anode.

4. The primary or secondary alkaline cell of claim 1, wherein said large surface area metallic copper is present in said anode composition admixture in the amount of about 2% to about 10% by weight of said anode.

5. The rechargeable alkaline cell of claim 3, wherein said large surface area metallic copper is present in said anode composition admixture in the amount of about 2% to about 10% by weight of said anode.

6. The primary or secondary alkaline cell of claim 1, wherein said cell is cylindrical with said cathode in the form of a ring, and with said anode located within said ring; where said current collector is in the form of a wire or nail piercing said anode; and said separator surrounds said anode.

7. The rechargeable alkaline cell of claim 3, wherein said cell is cylindrical with said cathode in the form of a ring, and with said anode located within said ring; where said current collector is in the form of a wire or nail piercing said anode; and said separator surrounds said anode.

8. The rechargeable alkaline cell of claim 3, wherein said cell is made in the form of spiral; said cathode being supported on a metal screen; said anode including a non-conductive screen; and said separator being located between said anode and said cathode.

9. The rechargeable alkaline cell of claim 3, wherein said cell is made in the form of a plurality of interleaved plates; said cathode being supported on a metal screen; said anode including a non-conductive screen; and said separator being located between said anode and said cathode.

10. The rechargeable alkaline cell of claim 3, wherein said cell is made with bipolar plates; each said bipolar plate comprising a two-sided conducting foil which is compatible with said zinc on the anode side thereof and compatible with said manganese dioxide on the cathode side thereof; said conducting foil comprising said current collector.

11. The primary or secondary alkaline cell of claim 1, wherein said separator comprises at least two discrete layers; the first of said layers being in physical contact with said anode, and having ion-permeable but particle unpenetrable characteristics; the second of said layers being non-oxidizable and capable of absorbing or wicking said aqueous alkaline electrolyte.

12. The rechargeable alkaline cell of claim 3, wherein said separator comprises at least two discrete layers; the first of said layers being in physical contact with said anode, and having ion-permeable but particle unpenetrable characteristics; the second of said layers being non-oxidizable and capable of absorbing or wicking said aqueous alkaline electrolyte.

13. The primary or secondary alkaline cell of claim 11, where said first separator layer is a regenerated cellulosic material such as cellophane or sausage casing material.

14. The rechargeable alkaline cell of claim 12, where said first separator layer is a regenerated cellulosic material such as cellophane or sausage casing material.

15. The primary or secondary alkaline cell of claim 1, where said cathode includes an admixture of electrolytic manganese dioxide, and graphite in the amount of between 5% to 15% by weight.

16. The rechargeable alkaline cell of claim 3, where said cathode includes an admixture of electrolytic manganese dioxide, and graphite in the amount of between 5% to 15% by weight.

* * * * *

UNITED STATES PATENT AND TRADEMARK OFFICE
CERTIFICATE OF CORRECTION

PATENT NO. : 5,164,274
DATED : November 17, 1992
INVENTOR(S) : Kordesch et al

It is certified that error appears in the above-indentified patent and that said Letters Patent is hereby corrected as shown below:

On the title page: Item [22] filing date should read --November 5, 1990 --.

Signed and Sealed this

First Day of November, 1994

Attest:

BRUCE LEHMAN

*Attesting Officer*  *Commissioner of Patents and Trademarks*